E. H. CARROLL.
CLUTCH.
APPLICATION FILED SEPT. 9, 1915.

1,266,550.

Patented May 21, 1918.
2 SHEETS—SHEET 1.

Witnesses.
R. D. Tolman.
Penelope Cumberbach.

Inventor
Elbert H. Carroll.
By Fowler & Kennedy
Attorneys.

E. H. CARROLL.
CLUTCH.
APPLICATION FILED SEPT. 9, 1915.

1,266,550.

Patented May 21, 1918.
2 SHEETS—SHEET 2.

Witnesses.
R. D. Tolman.
Penelope Comberbach.

Inventor
Elbert H. Carroll.
By Fowler & Kennedy
Attorneys.

UNITED STATES PATENT OFFICE.

ELBERT H. CARROLL, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CLUTCH.

1,266,550.  Specification of Letters Patent.  Patented May 21, 1918.

Application filed September 9, 1915. Serial No. 49,820.

*To all whom it may concern:*

Be it known that I, ELBERT H. CARROLL, a citizen of the United States, residing at Worcester, in the county of Worcester and Commonwealth of Massachusetts, have invented a new and useful Improvement in Clutches, of which the following, together with the accompanying drawings, is a specification.

The present invention relates to a clutch, comprising a driving and a driven member, with novel means for connecting said members to rotate in unison. The essential features of my invention are fully set forth in the following description, and pointed out in the annexed claims, reference being had to the accompanying drawings, in which—

Similar reference characters refer to similar parts in the different figures.

Figure 1:
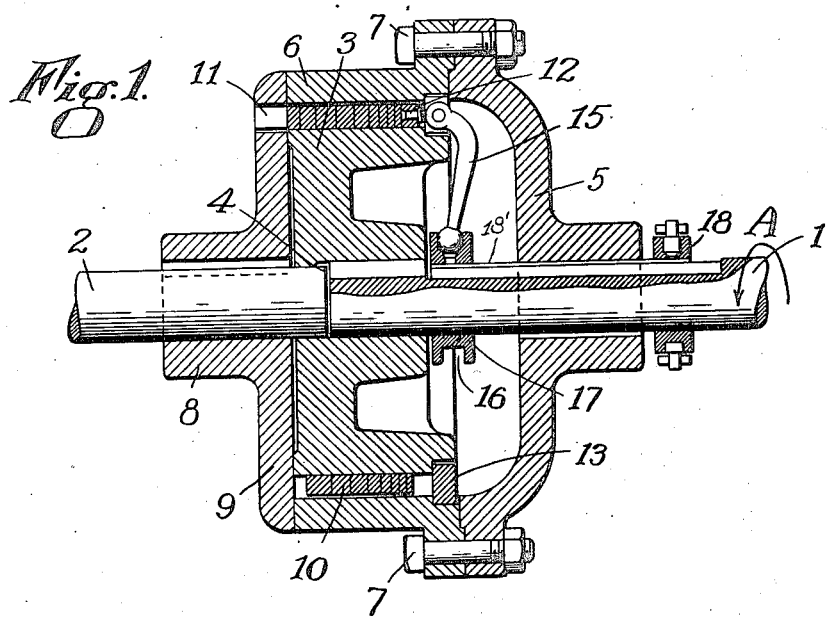
Figure 1 is a vertical sectional view of a clutch embodying my invention.

Referring particularly to Fig. 1, there is shown a driving member or shaft 1, which is rotatable in either direction from any suitable source of power, not shown. The form of device shown in Fig. 1 is concerned with the provision of novel and improved means for transmitting, at will, the rotation of the driving shaft 1, in either direction, to an axially alined driven member or shaft 2. To this end the shaft 1 has keyed thereto a cylindrical block or hub 3, the face of which may be recessed, if desired, as at 4, to serve as a journal bearing or support for the adjacent end of the driven shaft 2. The shaft 1 has also keyed thereto, at a distance from the hub 3, a spider or disk 5 providing a drum or shell 6 spaced from and surrounding the periphery of said hub. The shell 6 is preferably attached to the spider 5 by bolts 7 or the like, to permit access to the interior of the clutch without dismantling the same, but obviously the shell and spider may be integral if desired.

Figure 4:
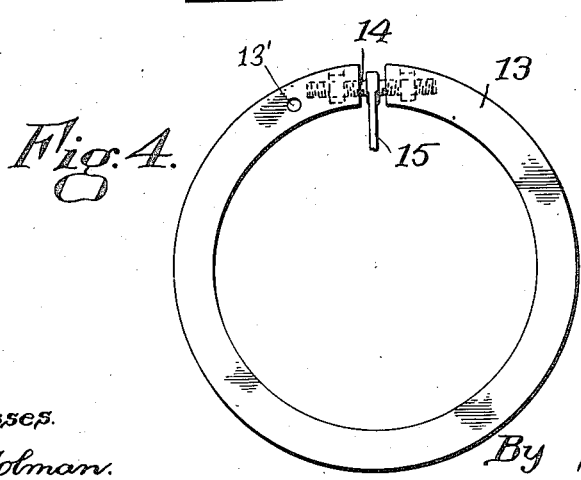
Fig. 4 is a detail view of an expanding and contracting ring, employed in connection with each of the three forms of devices illustrated respectively in Figs. 1, 2 and 3.

Keyed to the driven shaft 2 is a collar 8, having a flange 9 coextensive with the outer periphery of the shell 6, as shown. In the space between the hub 3 and shell 6 is disposed a spring 10 consisting of a spirally wound band which may, if desired, gradually taper in thickness from the end nearest the flange 9. The width of the band, measured radially of the axis of shaft 1 is slightly less than the width of the space between the hub and the shell, so that the convolutions of the spring do not quite fill said space. The large end of the band is attached by a pin 11, or other suitable means, to the flange 9, while the small end of said band is attached by a pin 12, or other suitable means, to a split or parted ring 13 near one free end of the latter, as shown at 13', Fig. 4. This ring is received loosely in oppositely facing recesses in the inner periphery of the shell 6 and the circumference of the hub 3, respectively.

The free ends of said ring 13 are connected by a right and left-hand screw, or turn-buckle 14, operated by a lever 15 attached to the same between said free ends. The other end of the lever 15 is received loosely within a groove 16 on a collar 17, splined to shaft 1, and slidable back and forth in the space between hub 3 and spider 5 by means of suitable shipper mechanism indicated by the numeral 18, said collar being connected to the shipper mechanism by a sliding bar 18'. The movement of the collar 17 to the left, Fig. 1, causes the turn-buckle 14 to expand ring 13, causing its outer periphery to make frictional contact with the shell 6; the movement of said collar to its extreme right hand position, Fig. 1, contracts said ring, causing its inner periphery to make frictional contact with the hub 3, while the retention of said collar in an intermediate position prevents operative frictional contact of said ring with either of said rotating parts.

The operation of the mechanism above described is as follows:—Assuming the shaft 1 to be rotating in a counterclockwise direction, indicated by the arrow A, Fig. 1, it will be clear that with the collar 17 moved into either extreme position, the ring 13 by reason of its engagement either with the hub 3 or shell 6, will be caused to rotate in the same direction as said shaft, in both instances. In both instances, therefore, the initial rotation of said ring will serve gradually to draw the convolutions of band 10 into close frictional engagement with the hub 3. As the band is thus drawn up upon the hub, in both instances, the rotation of the latter is imparted to the band, and through said band without shock to the collar 8 and driven shaft 2, to rotate the latter in the same direction as driving shaft 1. When the collar 17 is held in an intermediate position, the ring 13 and spring 10 will not grip tightly on either the hub 3 or shell 6.

Assuming the shaft 1 to be rotating in a clockwise direction, opposite to that indicated by the arrow A, Fig. 1, it will be clear that with the collar 17 moved into either extreme position, the ring 13, for the reasons above set forth, will be caused to rotate in the same direction as the shaft, in both instances. In both instances, therefore, the initial rotation of said ring will serve to expand the convolutions of band 10 into close frictional engagement with the inner periphery of the shell 6, causing the band, and with it the collar 8 and driven shaft 2, to rotate in the same direction as the driving shaft 1. As before, the disposition of the collar 17 in an intermediate position renders the band 10 inoperative as a clutching device.

It will be clear then, that irrespective of the direction in which the driving shaft 1 is rotating, the disposition of the collar 17 in either of its extreme positions will cause the rotation of shaft 1 to be imparted, without shock, to drive the shaft 2 in the same direction. Moreover, a reversal in the rotation of the driving shaft 1, when the latter is rotating in either direction, is communicated to the driven shaft without shock, being accompanied merely by the movement of the band 10 out of frictional gripping contact with either hub 3 or shell 6, and into engagement with the other of said parts. Obviously, the statements made above hold true, when the shaft 2, instead of the shaft 1 is used as a driving member, as, for instance, by securing a driving pulley on the flange 9 of collar 8.

Figure 2:
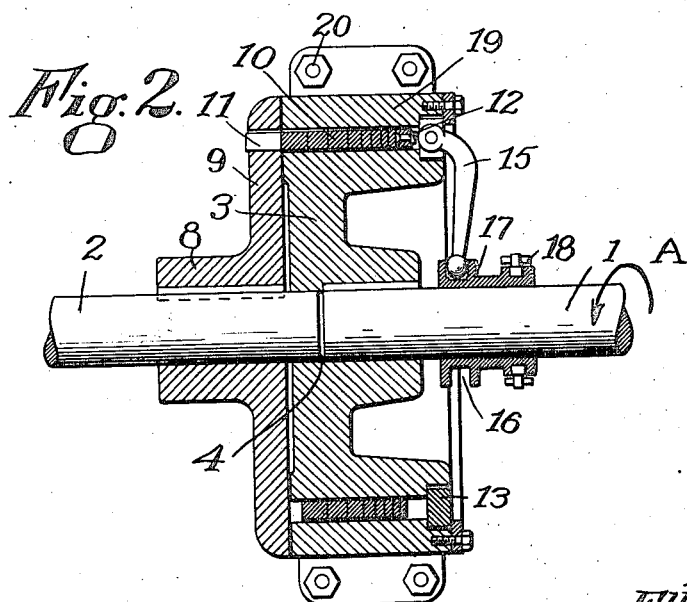
Fig. 2 is a similar view of a modified form of my invention.

In Fig. 2, the application of the principles set forth above is disclosed in connection with a braking device for stopping the rotation of the driven shaft after the release of the clutching mechanism. In the form of device shown, the spider 5 and shell 6 shown in Fig. 1, are omitted, a stationary sleeve 19, secured by flanges 20, 20 to a fixed framework or hanger, being disposed in surrounding relation to the hub 3 and band 10. The other parts are substantially of the form shown in Fig. 1. In the form of device shown in Fig. 2, assuming the shaft to be rotating in a clockwise direction, indicated by the arrow A, the movement of collar 17 to its extreme right hand position, causes the band 10 to be drawn tight on hub 3, with the result that shaft 2 will be driven in the same direction as shaft 1. In the intermediate position of collar 17, the clutching mechanism is rendered inoperative, by disconnecting the shaft 2 from the shaft 1. If the left hand movement of the collar 17 is continued, to carry the same into its extreme left hand position, the ring 13 is expanded into contact with the stationary sleeve 19, and if the shaft 2 continues its run under its own momentum, the spring 10 will expand outwardly against the inner periphery of the stationary sleeve 19, thereby acting as a brake to stop the rotation of shaft 2.

Figure 3:
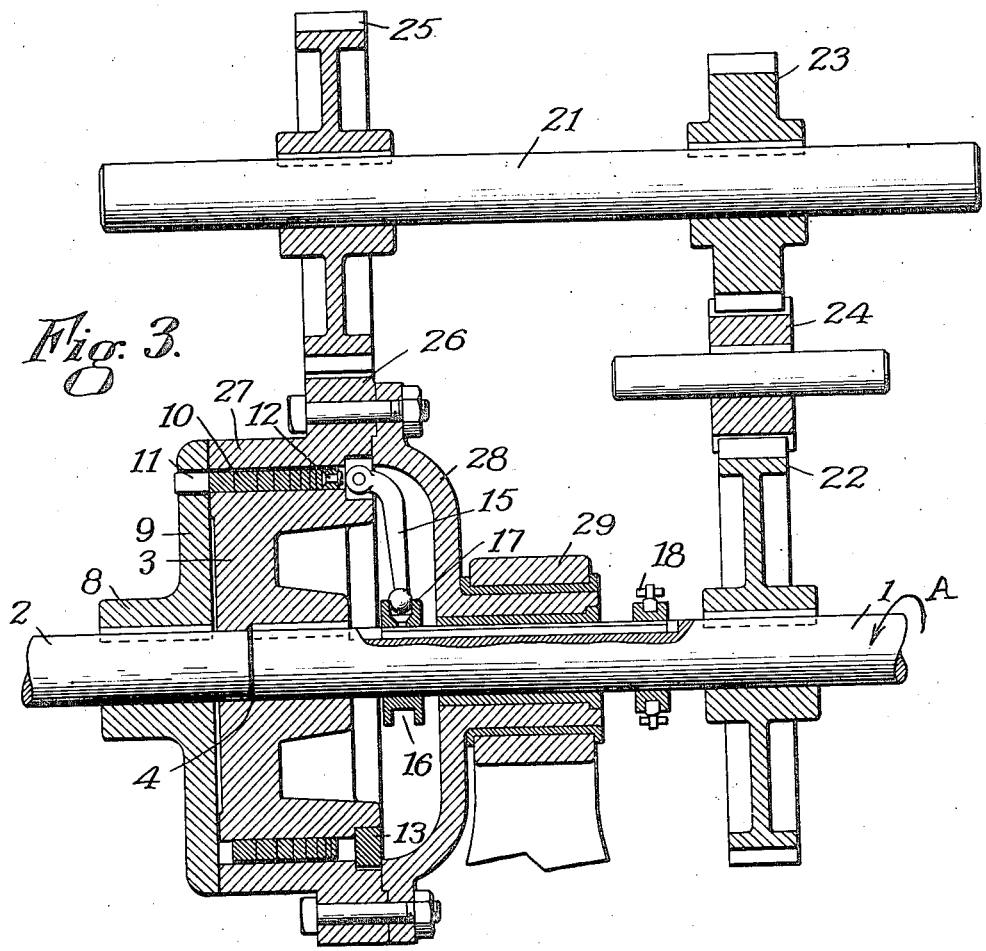
Fig. 3 is a similar view of another modification.

In the form of device shown in Fig. 3, a countershaft 21 is driven in the same direction as driving shaft 1, by any well known means, as by gears 22 and 23 and an interposed idler 24. A gear 25 on said countershaft meshes with a gear 26 on a shell 27 surrounding the hub 3, to drive said shell in the direction opposite to that in which shaft 1 is rotating. The shell 27 is attached to a spider 28, journaled for rotation independently of shaft 1, in a bearing 29. Assuming the rotation of shaft 1 in a counter-clockwise direction as shown by arrow A, it will be clear that the shell 27 will always rotate in the reverse direction. The movement of the collar 17 into its extreme right hand position causes the band 10 to tighten on the hub 3, thereby effecting the rotation of the driven shaft 2 in the same direction as shaft 1 and at the same speed. In the intermediate position of said collar, as previously set forth, there is no connection established between the shafts 1 and 2. In the extreme left hand position of said colllar, the ring 13 rotates with the reversely rotating shell 27, causing the band 10 to expand into contact with said shell, and driving the shaft 2 in the opposite direction to shaft 1, and at a speed dependent entirely upon the ratio of the gearing connecting shaft 1 to the shell 27.

I claim:—

1. In a mechanism of the character described, a driving member and a driven member, a clutching device attached to one of said members, said device presenting opposing frictional clutching surfaces, means associated with the other of said members in position for operative engagement with each of said clutching surfaces, and means for selectively operating said device to render either of said clutching surfaces operative.

2. In a mechanism of the character described, a driving member and a driven member, a clutching device attached to one of said members, said device presenting inner and outer frictional clutching surfaces, means associated with the other of said members in position for operative engagement with each of said clutching surfaces, and means for expanding or contracting said device to render one or the other of said clutching surfaces operative.

3. In a mechanism of the character described, a driving member and a driven member, a clutching device attached to one of said members, said device comprising a flexible band surrounding the other member, an outer member surrounding said band, and means for selectively operating said band to effect its engagement with each of said last mentioned members.

4. In a mechanism of the class described, a driving member and a driven member, a clutching device attached to said driven member and presenting inner and outer frictional clutching surfaces, and means movable into frictional contact with said driving member for rendering either of said clutching surfaces operative, depending upon the direction of rotation of said driving member.

5. In a mechanism of the class described, a driving member and a driven member, a clutching device attached to said driven member and presenting inner and outer frictional clutching surfaces, one of which is adapted for engagement with said driving member, and a member providing a surface for engagement by the other clutching surface of said clutching device.

6. In a mechanism of the class described, a driving member and a driven member, one of said members providing an annular space, a spiral band attached to the other member and disposed within said space, and means for expanding or contracting said band to effect its frictional engagement with the outer or the inner surface of said space.

7. In a mechanism of the class described, a driving member and a driven member, one of said members providing an annular space, a spiral band attached to the other member and disposed within said space, and means movable into frictional contact with said driving member for expanding or contracting said band into frictional engagement with the outer or the inner surface of said space, depending upon the direction of rotation of said driving member.

8. In a mechanism of the class described a driving member and a driven member, one of said members providing an annular space, a spiral band attached to the other member and disposed within said space, and means, attached to said band and movable into frictional contact with said driving member, for expanding or contracting said band into frictional engagement with the outer or the inner surface of said space, depending upon the direction of rotation of said driving member.

9. In a mechanism of the class described, a driving member and a driven member, one of said members providing an annular space, a spiral band attached to the other member and disposed within said space, and an expansible and contractible member for engagement with said driving member, for effecting the frictional engagement of said band with the outer or inner surface of said space, depending upon the direction of rotation of said driving member.

10. In a mechanism of the class described, a driving member and a driven member, and a spiral band attached to said driven member and presenting inner and outer frictional clutching surfaces for engagement respectively with corresponding surfaces on said driving member.

Dated this fourth day of September, 1915.

ELBERT H. CARROLL.

Witnesses:
WILLARD A. WINN,
GLADYS M. WALKER.